United States Patent [19]

Sugiyama et al.

[11] Patent Number: 5,104,159

[45] Date of Patent: Apr. 14, 1992

[54] THREADLESS COUPLING FOR PIPES AND AN AIR-TIGHT INNER CYLINDER THEREFOR

[76] Inventors: Kyukichi Sugiyama, 577 Ueki, Kamakura-shi, Kanagawa-ken; Masahiro Isoda, 9-10-6, Yokoyama 4-chome, Sagamihara-shi, Kanagawa-ken, both of Japan

[21] Appl. No.: 504,968

[22] Filed: Apr. 5, 1990

[30] Foreign Application Priority Data

Jan. 11, 1990 [JP] Japan .................... 2-2463

[51] Int. Cl.⁵ ............................................. F16L 19/00
[52] U.S. Cl. .................................. 285/373; 285/423; 285/424; 285/419; 285/383
[58] Field of Search ............... 285/373, 419, 421, 424, 285/369, 328, 423, 383; 24/19, 268, 536; 174/78, 84 S, 94 S; 277/235 R; 439/296, 299, 308, 369

[56] References Cited

U.S. PATENT DOCUMENTS

| | | | |
|---|---|---|---|
| 976,029 | 11/1910 | Birnbaum | 285/424 X |
| 2,027,824 | 1/1936 | Hunt | 285/369 |
| 2,073,338 | 3/1937 | Durkee | 285/373 X |
| 2,690,193 | 9/1954 | Smith | 285/373 X |
| 3,682,503 | 8/1972 | Bloom | 285/369 X |

FOREIGN PATENT DOCUMENTS

| | | | |
|---|---|---|---|
| 2260929 | 6/1974 | Fed. Rep. of Germany | 285/373 |
| 59136423 | 8/1955 | Japan . | |

*Primary Examiner*—Randolph A. Reese
*Assistant Examiner*—Heather Chun
*Attorney, Agent, or Firm*—Collard, Roe & Galgano

[57] ABSTRACT

A threadless coupling for pipes has a cylindrical coupling body having longitudinally-extending slots or sections along the entire length thereof, a pair of grip sections forming grooves facing oppositely from each other on the outside of the edges of both ends of the opening section of the coupling body, and a grip case which is slidable fitted for coupling on the pair of grip sections. The grip case is tapped with a hammer of the like to slide onto the pair of grip sections, thereby compressing the coupling body around the conduits to be coupled by decreasing the gap between the pair of grip sections and accordingly reducing the diameter of the coupling body.

4 Claims, 7 Drawing Sheets

THREADLESS COUPLING FOR PIPES AND AN AIR-TIGHT INNER CYLINDER THEREFOR

BACKGROUND OF THE INVENTION

1. Field of the Invention

The present invention relates to improvements in threadless couplings for pipes for connecting steel or plastic pipes such as electrical conduits, water-service pipes, steam pipes, and plant pipes.

2. Description of the Prior Art

In so-called electrical conduit laying operations for laying conduits in which insulated electrical wires or cables are placed, couplings are used to connect conduits of a fixed length, the number of which is determined by the length of piping to be laid. A coupling in conventional use comprises a tubular coupling provided with internal threads which is connected by screwing on to an externally threaded end of a conduit. This type of screw-on coupling is unusable when a pair of curved or bent conduits need to be connected. This is due to the fact that the connecting operation must be typically held in a narrow place and at least one of the conduits to be connected must have sufficient room to allow it to be rotated and screwed onto the other conduit.

Figure 1A:
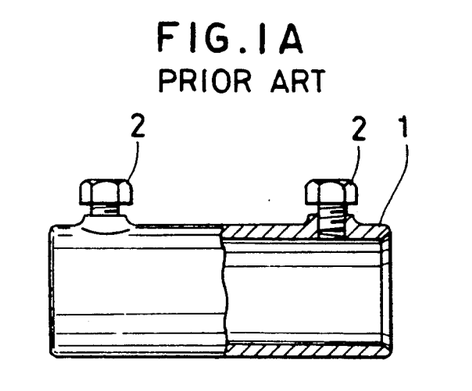
FIGS. 1A and 1B are a front view, in part section, and a side view, respectively, showing one example of a conventional threadless coupling.
Figure 1B:
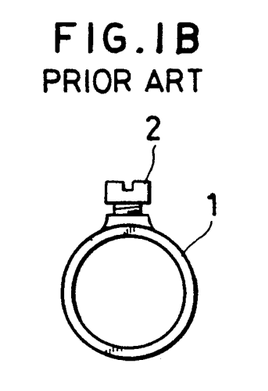

To obviate this inconvenience, threadless couplings capable of connection without rotating the conduit have been in use. A prior-art threadless coupling for thin-steel conduits which is specified in the Japanese Industrial Standards (JIS) is shown in FIGS. 1A and 1B. In these drawings, coupling is performed by inserting the ends of the conduits into both ends of a cylindrical coupling body 1 until the end of each conduit comes in contact with a pipe stopper (not shown) and by tightening the tightening screws 2. This coupling gives rise to the following problems: the tightening of the tightening screws 2 is time consuming, resulting in a poor operation efficiency; threads of the tightening screws 2 are often likely to be stripped or crushed; and the conduits, being fastened at two points by the tightening screws 2, cannot be maintained straight.

Figure 2:
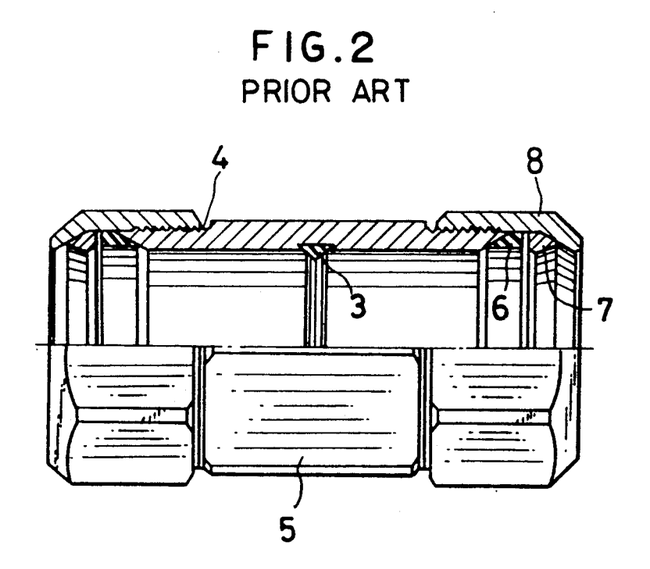
FIG. 2 is a front view, in part section, showing another example of the conventional threadless coupling.

A threadless coupling illustrated in FIG. 2 has also been used for connection of gas pipes, water-service pipes, and conduits. This threadless coupling has a cylindrical coupling body 5, a pipe stopper 3 at the center of its inner periphery and external threads 4 on the outer periphery of both of its ends, a pair of rubber rings 6, a pair of metal cut rings 7, and a pair of cap nuts 8 for pressing the rubber rings 6 and the cut rings 7 against the end of the coupling body 5.

When this threadless coupling is used to connect electrical conduits, first the cap nuts 8, the cut rings 7 and the rubber rings 6 are inserted (in the order recited) over the ends of both of the conduits. Then the ends of the conduits are inserted into the coupling body 5 such that these ends will be butted. Finally, the cap nuts 8 are tightened such that the cut rings 7 and the rubber rings 6 are pressed against both ends of the coupling body 5 and deflected inwardly into contact with the conduits.

However, this type of coupling has a complicated construction and, therefore, requires a high manufacturing cost. Also, the connection of this coupling requires the assembling and tightening of many parts by specific procedures, which is also time consuming, thus resulting in a low operational efficiency.

Figure 3A:
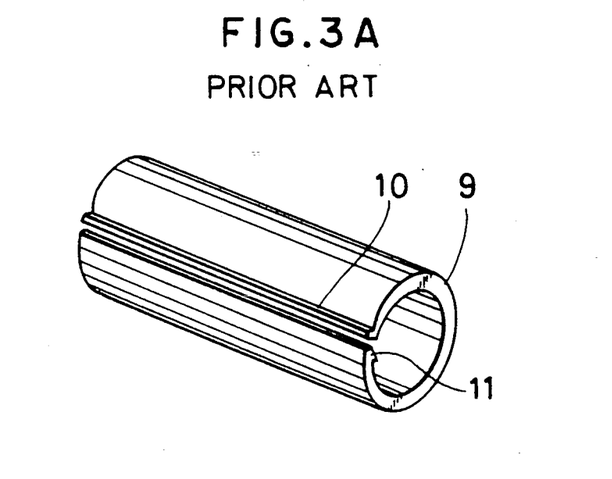
FIGS. 3A, 3B and 3C are respectively a perspective view showing another example of the conventional threadless coupling, a perspective view showing conduits in a connected state, and a front view, in part section, showing the same.
Figure 3B:
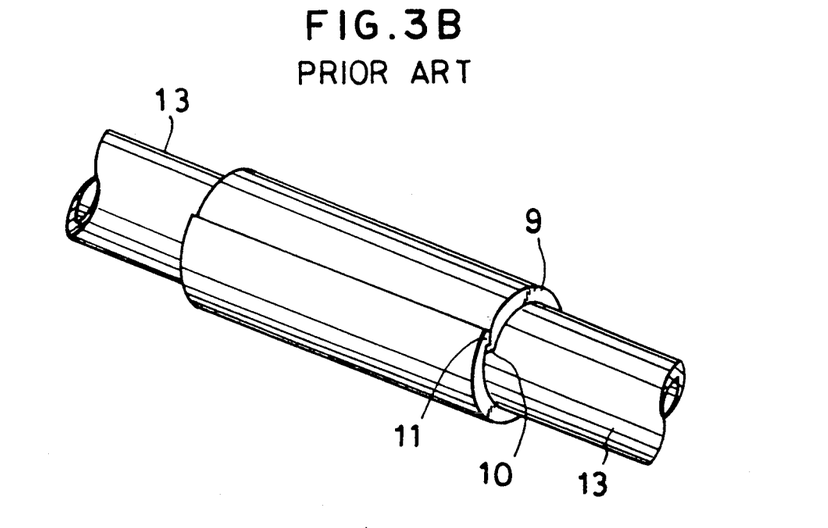
Figure 3C:
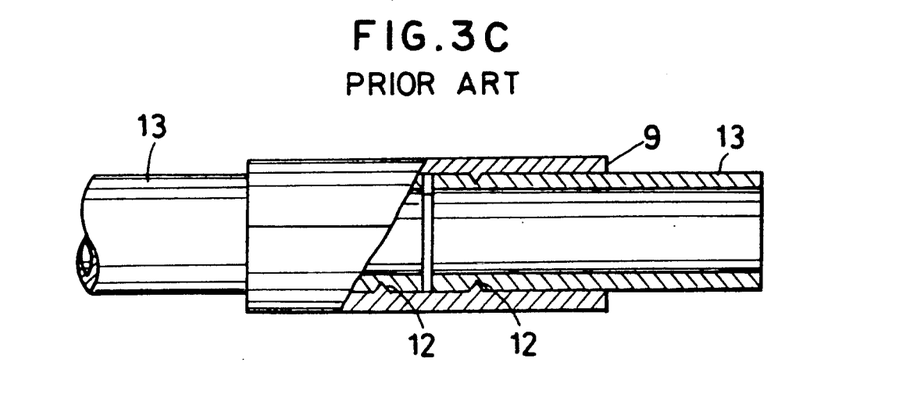

Furthermore, a prior-art threadless coupling shown in FIGS. 3A, 3B and 3C has been proposed in a Japanese utility model application. This threadless coupling has a cylindrical body 9 formed in a cylindrical shape from a flat square metal-plate having opposite edge sections which can be brought close to each other. In these opposite edge sections of the cylindrical body 9 are formed hook-like engaging sections 10 and 11 which are engageable with each other. As shown in FIG. 3C, in the inner peripheral surface of this cylindrical body 9, two projections 12 are formed to bite the conduits to effect fastening.

When the conduits 13 are connected, the conduits 13 are inserted as deep into the central section of the cylindrical body 9 from the opposite ends thereof. Then the cylindrical body 9 is closed until the engaging sections 10 and 11 are engaged with each other as shown in FIGS. 3B and 3C.

However, since a considerable force is required to engage the engaging sections 10 and 11, there exist the following problems: a special tool or device is needed so that the connecting operation is not simple; the coupling is unusable for thin steel conduits because of the use of the engaging sections 10 and 11; and the conduits, once connected, cannot easily be disconnected.

SUMMARY OF THE INVENTION

It is, therefore, an object of the present invention to provide a pipe coupling which solves the above-mentioned problems.

It is a particular object of the present invention to provide threadless coupling for pipes capable of improving pipe connecting operational efficiency.

It is a more particular object of the present invention to provide an air-tight sealed inner cylinder for a threadless coupling capable of improving air tightness and capable of easy and facile installation in the threadless coupling.

According to the present invention, the threadless coupling comprises a coupling body having an opening which is open throughout its full length parallel to the axis of the coupling body and formed into a cylindrical form; a pair of groove-like grips face opposite one another, outwardly of both ends of the opening of the coupling body; and a grip case which is slidable fitted for connection in the pair of grip sections. The grip case is slid to be fitted to the pair of grip sections by tapping with a hammer, reducing the distance between the grip sections and, in turn, decreasing the diameter of the coupling body to compress the coupling body to the pipes, and thereby improving the work efficiency of pipe connection.

Furthermore, according to a further embodiment of the present invention, an air-tight inner cylinder for a threadless coupling if provided which is formed into a cylindrical shape and is made of resilient material. The inner cylinder is intended to be installed in close fitting contact with the inner surface of the coupling body of the threadless coupling. Annular projections which serve as stoppers are integrally formed at both outer end surfaces of the inner cylinder. A linear projection defining an engaging portion is disposed parallel to the longitudinal axis of the inner cylinder and is integrally formed on its outer surface. An annular central stopper or projection is integrally formed on a central part of the inner surface of the cylinder. Air-tight reinforcing portions of annular projections are integrally formed on the inner surface at both sides of the center stopper, respectively, and a reinforcing plate is encased within the engaging portion. With this arrangement, the outer surface of the air-tight inner cylinder is press-contacted with the inner surface of the coupling body and the air-tight reinforcing part at the inner surface is press-contacted with the outer surface of the pipe to keep an air tight fit. Furthermore, the stopper portions are engaged with both ends of the coupling body and the engaging portion is engaged with an opening of the coupling body. As a result, the air-tight inner cylinder is closely contacted with the inner surface of the coupling body. With this arrangement, it is possible to increase air tightness and easily perform an installing operation for the threadless coupling.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 4:
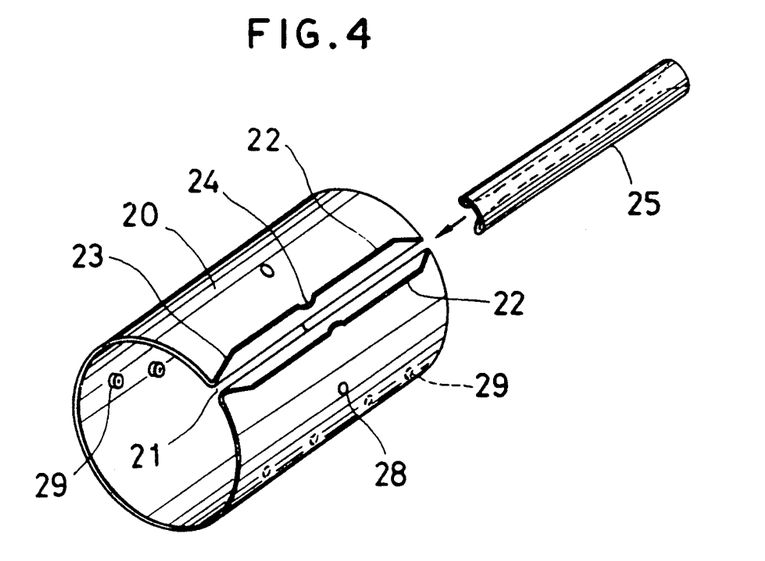
FIG. 4 is a perspective view showing one embodiment of the present invention.

Referring now to the drawings, FIG. 4 is a perspective view showing a threadless coupling for connecting electrical conduits according to one embodiment of the present invention. The threadless coupling includes a coupling body 20 made from an elastic metal sheet (e.g., sheet steel), formed into a cylindrical form by pressing. It has a length and an inside diameter large enough to insert the ends of a pair of conduits to be connected. This coupling body 20 is provided with an opening or slot 21 formed through its entire length parallel to its longitudinal axis. The edges of body 20 defining this opening 21 are bent outwardly by pressing, so as to form a pair of groove-like grip sections 22 facing in opposite directions from each other. Both ends of the grip sections 22 are inclined or tapered, forming inclined sections 23. At the center of the grip section 22 is formed a recessed section or cut-out 24. Recessed sections 24 may be omitted.

Figure 5A:
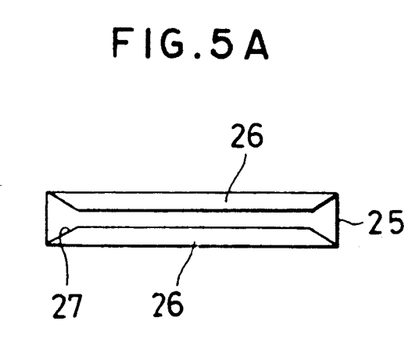
FIGS. 5A and 5B are a rear view and a side view, respectively, showing a grip case in one embodiment of the present invention.
Figure 5B:
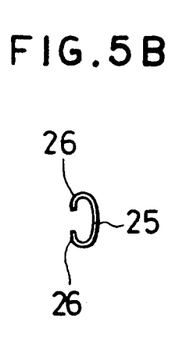

A metal grip case 25 is slidable fitted over the pair of grip sections 22 to connect the conduits. Case 25 is nearly as long as the coupling body 20, and the shape of its back and side surfaces is as shown in FIGS. 5A and 5B. The edges of both ends of the grip case 25 are folded inwardly, so as to form fastening sections 26 for fastening the pair of grip sections 22. Both ends of these fastening sections 26 are inclined or tapered to provide inclined sections 27.

Figure 6:
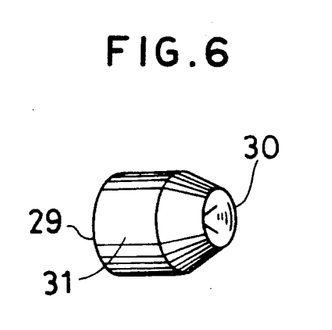
FIG. 6 is a perspective view showing a biting member in one embodiment of the present invention.

Spaced-apart inwardly projecting center stoppers 28 are provided on the inside surface of coupling body 20 at its longitudinal center by press-fitting. Furthermore, a plurality of biting members 29 are provided on the inside surface of the coupling body 20, the details of which are illustrated in FIG. 6. The inner end of the biting member 29 is formed in the shape of a truncated cone and its end face is conically depressed, forming a blade section 30. The base section 31 of the biting member 29 is secured to the coupling body 20 by welding or by pressing. The biting member 29 is produced of a hardened steel material.

Figure 7:
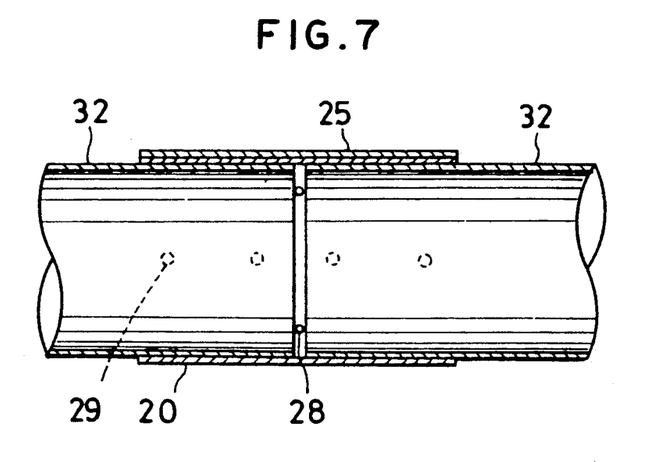
FIG. 7 is a sectional view showing the conduits in a connected state according to one embodiment of the present invention.
Figure 8:
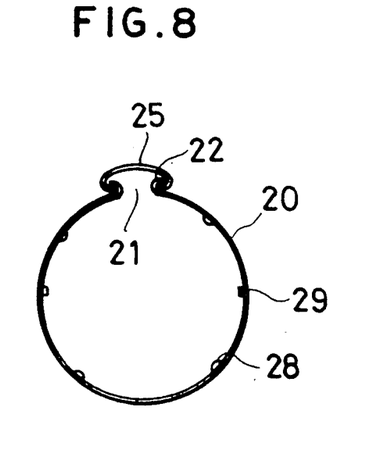
FIG. 8 is a side view showing one embodiment of the present invention in a fitted state with the grip case.
Figure 9:
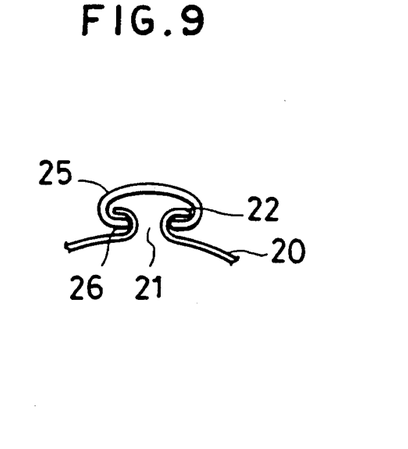
FIG. 9 is an enlarged side view showing a grip section and the grip case in a fitted state.
Figure 10:
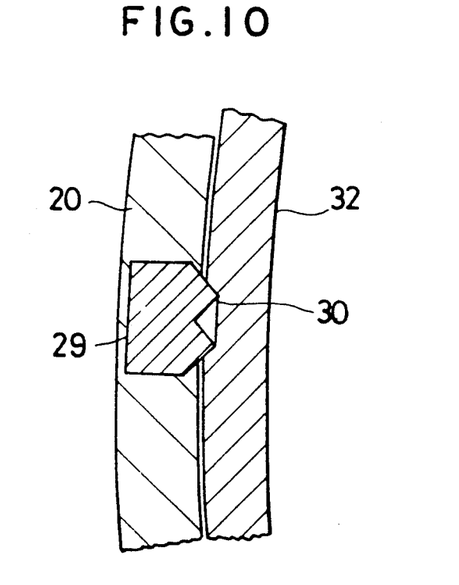
FIG. 10 is a sectional view showing the biting member in use.

Next, a method for connecting conduits by using the threadless coupling shown in FIG. 4 will be explained. First, the conduits 32 to be connected are inserted into both ends of the coupling body 20 until they contact the center stops 28 as shown in FIG. 7. Subsequently, the grip case 25 is inserted over a pair of grip sections 22 from one of the inclined sections 23, being slid fully into position by tapping with a hammer. The grip case 25 installed in position is shown in FIGS. 8 and 9 (the conduits 32 are not illustrated). In this state, since the fastening sections 26 of the grip case 25 fasten the pair of grip sections 22 with the gap therebetween reduced, the coupling body 20 is decreased in diameter, thus being compressed against the conduits 32. The blade sections 30 of the biting members 29, therefore, bite into the outer peripheral surfaces of the conduits 32 as shown in FIG. 10, thereby securely fastening the coupling body 20 to the conduits 32 and reducing an electrical resistance at the connection between the coupling body 20 and the conduits 32 to maintain all the conduits 32 at a ground potential. Furthermore, the presence of the biting members 29 can maintain the state of reliable connection of the conduits, which therefore will not become loosened with vibrations. Since, in this pipe connecting work, the grip case 25 is fitted to the grip sections 22 simply with a hammer, even unskilled personnel can perform the work quite easily, improving operational efficiency.

Furthermore, since the grip sections 22 and the fastening sections 26 of the grip case 25 are provided with the inclined sections 23 and 27, the grip case 25 can be installed with ease. In addition, since the grip sections 22 have the recesses 24, the grip case 25 in a fully fitted state, can maintain its fastening force at the ends of the grip sections 22; that is, the grip sections 22 will never become loose to open.

Figure 11:
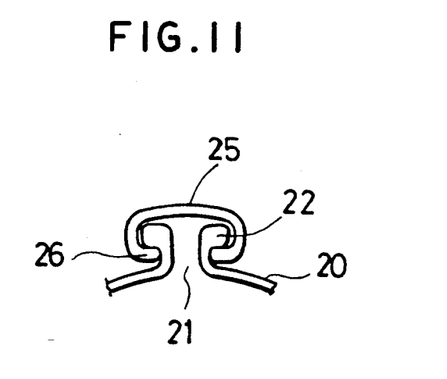
FIG. 11 is an enlarged side view showing another example of the grip section and the grip case.
Figure 12:
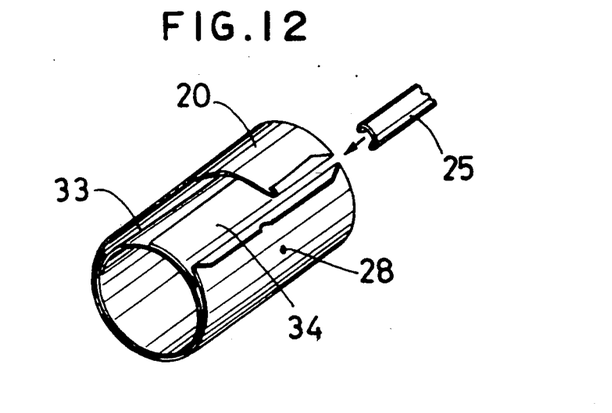
FIG. 12 is a perspective view, partly broken away, showing another embodiment of the present invention.
Figure 13:
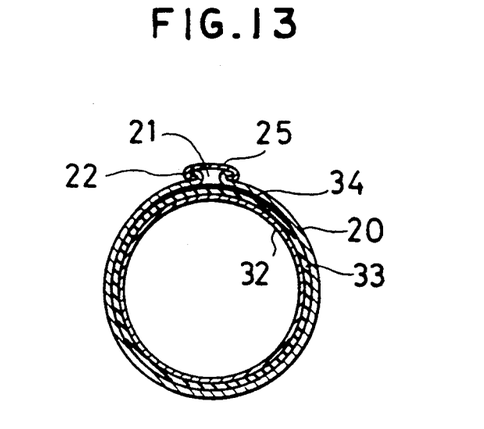
FIG. 13 is a sectional view showing another embodiment of the present invention in a connected state with conduits.
Figure 14:
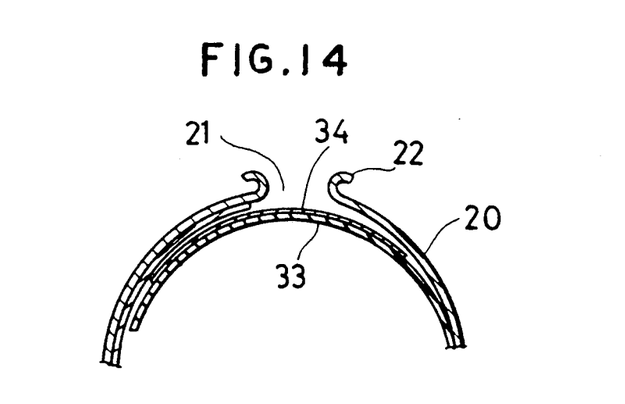
FIG. 14 is an enlarged sectional view showing one example of arrangement of a thin-sheet sealing member and thin metal sheet according to another embodiment of the present invention.

A pair of grip sections 22 and the fastening sections 26 of the grip case 25 may be formed not only by folding but by molding. In this case, the shape of the grip sections 22 and the fastening sections 26 of the grip case 25 are as illustrated for example in FIG. 11.

The materials of the coupling body 20 and the grip case 25 are not limited to metals alone, but may be plastics.

FIGS. 12 to 15 show another embodiment of the present invention. Differences of this embodiment from the embodiment shown in FIGS. 4 to 10 are that rubber and other water-proof and air-tight thin-sheet sealing material 33 are disposed along the inner peripheral surface of the coupling body 20, and also there is disposed a thin metal sheet 34 for closing the opening 21 between the inside of the opening section 21 of the coupling body 20 and a thin-sheet sealing material 23, thereby imparting water-proofness. The thin metal sheet 34 is preferably formed integral with the thin sheet sealing material 33 by, e.g., bonding.

Figure 15:
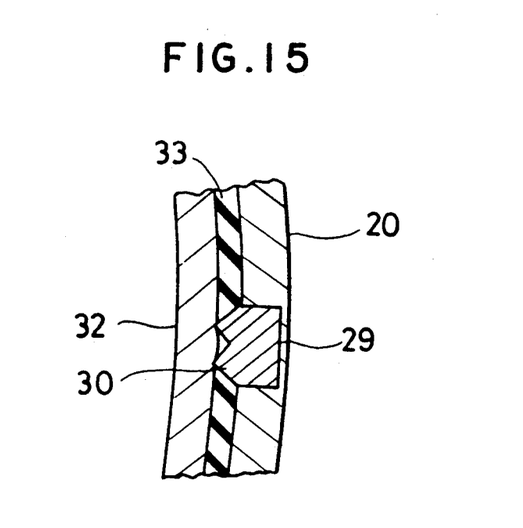
FIG. 15 is a sectional view showing the biting member in use according to another embodiment of the present invention.

It is also preferable that the thin sheet sealing material 33 is formed longer than the inner peripheral surface of the coupling body 20 and is disposed partly overlapped along the inner peripheral surface of the coupling body 20. The blade section 30 of the biting member 29, as shown in FIG. 15, bites deep into the outer surface of the conduit 32 through the thin-sheet sealing material 33.

Figure 16:
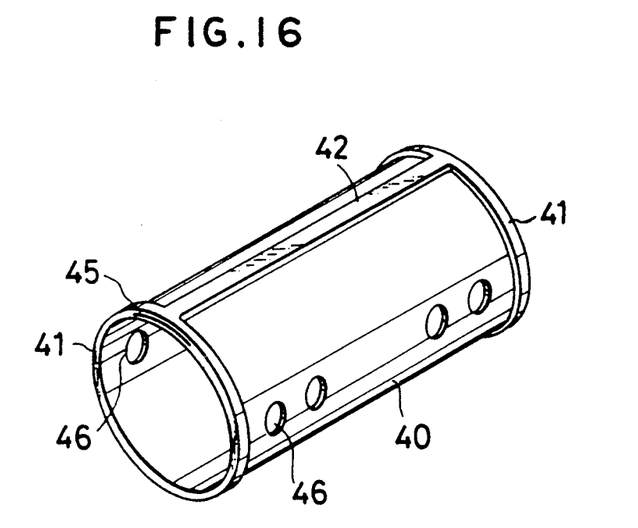
FIG. 16 is a perspective view showing an air-tight inner cylinder for a threadless coupling of another preferred embodiment of the present invention.

FIG. 16 shows an air-tight inner cylinder for the threadless coupling which is another preferred embodiment of the present invention and FIGS. 17 to 20 show the threadless coupling to which the air-tight inner cylinder shown in FIG. 16 is installed.

Figure 17:
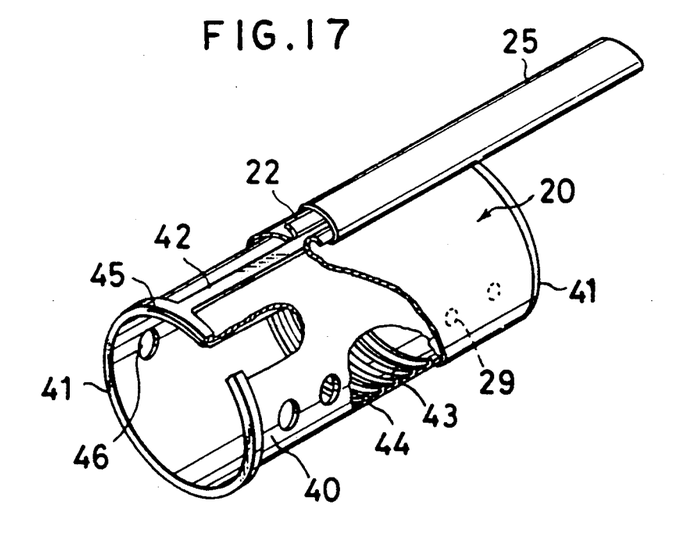
FIG. 17 is a perspective view, partly broken away, showing a threadless coupling to which the air-tight inner cylinder shown in FIG. 16 is installed.
Figure 18:
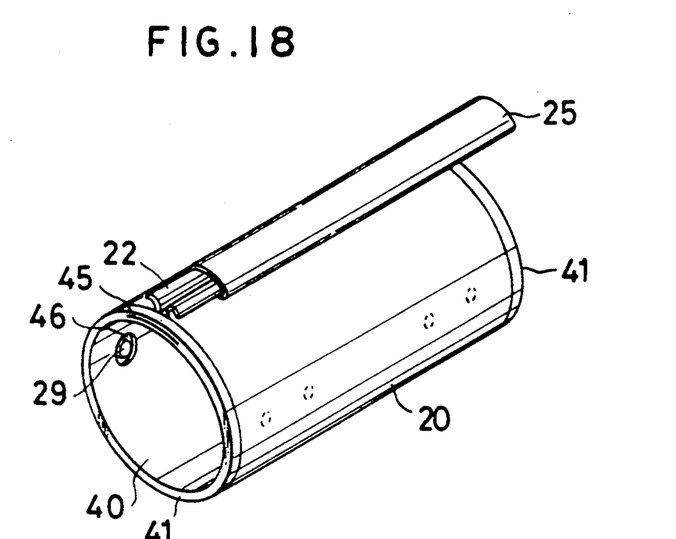
FIG. 18 is a further perspective view thereof.
Figure 19:
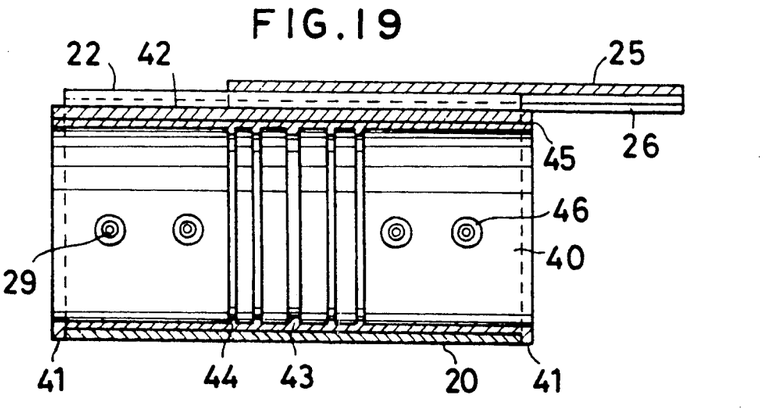
FIG. 19 is a longitudinal sectional view thereof.
Figure 20:
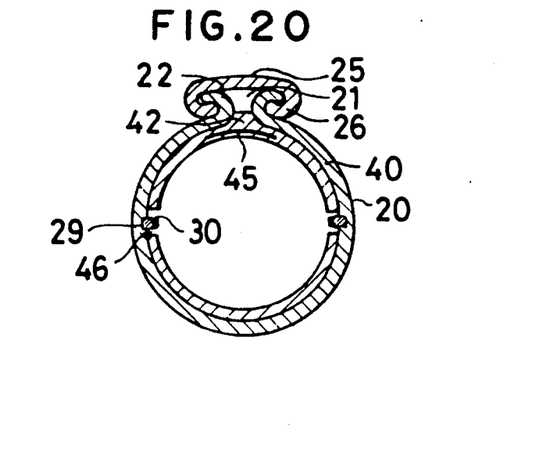
FIG. 20 is a transverse sectional view thereof.

In FIG. 16, the air-tight inner cylinder 40 is formed into a cylindrical member and is made from resilient material such as rubber. Outwardly-projecting annular stoppers 41 are integrally formed on both ends of the outer surface of the air-tight inner cylinder 40. A rectilinear, longitudinally extending, engaging portion 42 is integrally formed on the outer surface of the cylinder 40. As shown in FIGS. 17 and 19, an annular, radially inwardly projecting center stopper 43 is integrally formed on the center part of the inner surface of the air-tight inner cylinder 40, and two annular projecting air-tight reinforcing portions 44 are integrally formed on the inner surface of the cylinder at both sides of the center stopper 43. A metallic reinforcing plate 45 is buried within the engaging portion 42 and integrally formed therewith. The width of the reinforcing plate 45 is wider than the width of the opening 21 of the coupling body 20. A plurality of biting member through-pass holes 46 are arranged at positions spaced apart by 90° in a spatial manner.

FIGS. 17 to 20 illustrate a condition in which the air-tight inner cylinder 40 is closely contacted with the inner surface of the coupling body 20. Under this condition, the stopper portions 41 are engaged with both ends of the coupling body 20 so as to prevent an axial displacement of the air-tight inner cylinder 40. The engaging portion 42 is engaged with the opening 21 of the coupling body 20, resulting in that a position setting of the air-tight inner cylinder 40 in its circumferential direction is carried out. Biting members 29 pass through the biting member through pass holes 46 and then its blade portions 30 project inwardly toward the inner surface of the air-tight inner cylinder 40. The air-tight inner cylinder 40 may be fixed to the inner surface of the coupling body 20 with adhesive or it may merely be in contact with it.

The coupling body 20 and the grip case 25 shown in FIGS. 17 to 20 are the same as those shown in FIG. 4 except for the fact that the coupling body 20 has no center stopper 28. That is, the coupling body 20 is comprised of the longitudinally-extending opening 21 extending over its entire length, a pair of grip sections 22 forming grooves directed in opposite directions to each other at both outer edges of the opening 21 of the coupling body 20, and a plurality of biting members 29 projecting from the inner surface of the coupling body 20 and having blade sections which serve to bite into the outer surfaces of the pipes to be inserted, and the grip case 25 which is slidable fitted to a pair of grip sections 22 so as to connect them to each other.

For pipes that are to be connected by using the threadless coupling shown in FIGS. 17 to 20, the pipes are initially inserted into opposite ends of the coupling body 20 until they may abut against the center stopper 43. Then, the grip case 25 is fitted onto the pair of grip sections 22 by sliding it onto one end of the grip sections, the grip case 25 is struck by a hammer to slide it completely onto the grip sections. When this slideable mounting is completed, the fastening sections 26 of the grip case 25 draw the pair of grip sections 22 together, thus reducing the spacing between the grip sections 22, and, in turn, reducing the diameter of the coupling body 20. This causes the inner surface of the coupling body 20 to be press contacted with the outer surface of the air-tight inner cylinder 40. At the same time, the air-tight reinforcing part 44 of the air-tight inner cylinder 40 is press-contacted with the outer surfaces of the pipes. With these snug-fit arrangements, a high air-tight seal is formed between each of the pipes and the coupling body 20, so that it is possible to prevent gas or liquid flowing in the pipes from leaking from the threadless coupling. In addition, the blade sections 30 of the biting members 29 bite into the outer surfaces of the pipes to be connected and reliably maintain a positive mechanical and electrical connection between the coupling body 20 and each of the pipes.

The present invention has been described in detail with particular reference to preferred embodiments thereof but it will be understood that variations and modifications can be effected within the spirit and scope of the invention.

What is claimed is:
1. A threadless coupling for pipes, comprising:
   a generally cylindrical coupling body having a longitudinally-extending slot extending the entire length thereof disposed parallel to the longitudinal axis of said coupling body, said body having a pair of opposite ends having edges which cooperate to define said slot, which, in turn, defines an opening section;

a pair of groove-like grip sections formed on the outside of said edges of said ends;

a grip case slidable fitted over said groove-like grip sections for effecting coupling of said pair of grip sections and, in turn, the pipes to be coupled by said coupling;

an inner cylinder received within said coupling body including a generally cylindrical inner cylinder body having opposite ends which, in turn, have outer end surfaces;

annular, raised stopper portions integrally-formed at both outer end surfaces of said ends;

a raised coupling body-engaging portion integrally-formed on the outer surface of said inner cylinder body, extending linearly between said annular stopper portions, generally parallel to the longitudinal axis of said inner cylinder body;

a raised, radially-inwardly extending, annular center stopper portion, integrally-formed on the inside surface of said inner cylindrical body centrally thereof;

a plurality of raised-radially, inwardly extending, annular, auxiliary stopper portions, integrally-formed on the inside surface of said inner cylinder body on both sides of said center stopper portion; and a reinforcing plate disposed with said cylindrical body beneath said engaging portion; and wherein said stopper portions are engaged with both ends of said coupling and the coupling body-engaging portion is engaged with the opening of said coupling body.

2. An inner cylinder for a threadless coupling of the type including a generally cylindrical coupling body, wherein said inner cylinder made of a resilient material is dimensioned to closely contact the inner surface of said threadless coupling when installed therein, said inner cylinder comprising:

a generally cylindrical inner cylinder body having opposite ends which, in turn, have outer end surfaces;

annular, raised stopper portions integrally-formed at both outer end surfaces of said ends;

a raised coupling body-engaging portion integrally-formed on the outer surface of said inner cylinder body, extending linearly between said annular stopper portions, generally parallel to the longitudinal axis of said inner cylinder body;

a raised, radially-inwardly extending, annular center stopper portion, integrally-formed on the inside surface of said inner cylindrical body centrally thereof;

a plurality of raised-radially, inwardly extending, annular, auxiliary stopper portions, integrally-formed on the inside surface of said inner cylinder body on both sides of said center stopper portion; and a reinforcing plate disposed within said cylindrical body beneath said engaging portion.

3. An inner cylinder for a threadless coupling of the type including a generally cylindrical coupling body, wherein said inner cylinder made of a resilient material is dimensioned to closely contact the inner surface of said threadless coupling when installed therein, said inner cylinder comprising:

a generally cylindrical inner cylinder body having opposite ends which, in turn, have outer end surfaces;

annular, raised stopper portions integrally-formed at both outer end surfaces of said ends;

a raised coupling body-engaging portion integrally-formed on the outer surface of said inner cylinder body, extending linearly between said annular stopper portions, generally parallel to the longitudinal axis of said inner cylinder body;

a raised, radially-inwardly extending, annular center stopper portion, integrally-formed on the inside surface of said inner cylindrical body centrally thereof;

a plurality of raised-radially, inwardly extending annular, air-tight holding portions, integrally-formed on the inside surface of said inner cylinder body on both sides of said center stopper portions for press-contact with outer surfaces of pipes; and a reinforcing plate disposed within said cylindrical body beneath said engaging portion.

4. A threadless coupling for pipes having an inner cylinder to be received within a coupling body comprising:

a generally cylindrical coupling body having a longitudinally-extending slot extending the entire length thereof disposed parallel to the longitudinal axis of said coupling body, said body having a main cylindrical body portion and pair of opposite ends having edges which cooperate to define said slot, which, in turn, defines an opening section; said edges of both of said ends being folded outwardly, said body additionally including a relatively narrow neck section and adjacent to said main cylindrical body portion and said pair of outwardly folded ends, said neck section defining a pair of groove-like grip sections;

a grip case having inwardly folded edges which define fastening sections which engage said groove-like grip sections of said narrow neck section to couple said pair of grip sections and, in turn, the pipes to be coupled by said coupling;

a generally cylindrical inner cylinder body having opposite ends which, in turn, have outer end surfaces;

annular, raised stopper portions integrally-formed at both outer end surfaces of said ends;

a raised coupling body-engaging portion integrally-formed on the outer surface of said inner cylinder body, extending linearly between said annular stopper portions, generally parallel to the longitudinal axis of said inner cylinder body;

a raised, radially-inwardly extending, annular center stopper portion, integrally-formed on the inside surface of said inner cylindrical body centrally thereof;

a plurality of raised-radially, inwardly extending, annular, air-tight holding portions, integrally-formed on the inside surface of said inner cylinder body on both sides of said center stopper portion for contacting the outer surfaces of pipes; and a reinforcing plate disposed within said cylindrical body beneath said engaging portion;

wherein said stopper portions are engaged with both ends of said coupling body and the coupling body-engaging portion is engaged with the opening of said coupling body.

* * * * *